US012237671B1

United States Patent
Zhu

(10) Patent No.: US 12,237,671 B1
(45) Date of Patent: Feb. 25, 2025

(54) INTERNAL POWER SUPPLY APPARATUS FOR AUXILIARY DEVICE SUPPORTING POWER DELIVERY PROTOCOL

(71) Applicant: OSEE TECHNOLOGY LTD., Beijing (CN)

(72) Inventor: Liren Zhu, Beijing (CN)

(73) Assignee: OSEE TECHNOLOGY LTD., Beijing (CN)

( * ) Notice: Subject to any disclaimer, the term of this patent is extended or adjusted under 35 U.S.C. 154(b) by 0 days.

(21) Appl. No.: 18/770,735

(22) Filed: Jul. 12, 2024

(51) Int. Cl.
| | |
|---|---|
| *H02J 1/08* | (2006.01) |
| *H01M 10/42* | (2006.01) |
| *G05F 1/46* | (2006.01) |
| *H02M 3/158* | (2006.01) |

(52) U.S. Cl.
CPC ............ *H02J 1/08* (2013.01); *H01M 10/4264* (2013.01); *G05F 1/46* (2013.01); *H01M 2220/30* (2013.01); *H02M 3/1582* (2013.01)

(58) Field of Classification Search
CPC .. H02J 1/08; H01M 10/4264; H01M 2220/30; G05F 1/46; H02M 3/1582
See application file for complete search history.

(56) References Cited

U.S. PATENT DOCUMENTS

| | | | | |
|---|---|---|---|---|
| 2011/0267726 | A1* | 11/2011 | Ikeuchi | H01M 10/44 |
| | | | | 361/63 |
| 2017/0373882 | A1* | 12/2017 | Doi | H04L 12/40169 |
| 2018/0222332 | A1* | 8/2018 | Hosaka | H02J 7/24 |
| 2019/0036332 | A1* | 1/2019 | Kobayashi | H02J 7/0068 |
| 2019/0253268 | A1* | 8/2019 | Fu | H04L 12/40045 |
| 2020/0303939 | A1* | 9/2020 | Perry | H02J 7/0013 |
| 2022/0063436 | A1* | 3/2022 | Yeda | B60L 53/62 |
| 2022/0200294 | A1* | 6/2022 | Huang | G06F 1/26 |
| 2022/0350387 | A1* | 11/2022 | Alstad | G06F 13/4282 |
| 2024/0322699 | A1* | 9/2024 | Brahmbhatt | H02M 3/33592 |

* cited by examiner

*Primary Examiner* — Daniel Cavallari
*Assistant Examiner* — Brian K Baxter
(74) *Attorney, Agent, or Firm* — Cooper Legal Group, LLC

(57) ABSTRACT

The present application relates to an internal power supply apparatus for an auxiliary device supporting a PD protocol, including a battery interface, a USB-PD power interface, a forward power supply circuit, a reverse power supply circuit, a power bus, a control bus and a power supply control circuit; a first input end of the forward power supply circuit is connected with a battery; an input end of the power bus is connected with the forward power supply circuit, and the power bus is connected with an input end of the reverse power supply circuit, an input end of the power supply control circuit and an internal load of the auxiliary device; an output end of the reverse power supply circuit is connected with a photographic device through the USB-PD power interface; the power supply control circuit controls a voltage value output by the reverse power supply circuit.

8 Claims, 4 Drawing Sheets

INTERNAL POWER SUPPLY APPARATUS FOR AUXILIARY DEVICE SUPPORTING POWER DELIVERY PROTOCOL

FIELD OF THE INVENTION

The present application relates to the field of technologies of power supply of auxiliary devices used in cooperation with photographic devices, and in particular, to an internal power supply apparatus for an auxiliary device supporting a power delivery (PD) protocol.

BACKGROUND OF THE INVENTION

Photographic devices, such as single lens reflex cameras, video cameras, or the like, have small volumes, and only batteries with small volumes and small capacities can be mounted in the photographic devices due to limitations of the volumes of the photographic devices. The small-capacity battery cannot support long-time video shooting of the photographic device, and is required to be continuously replaced to meet a requirement for a working time of normal shooting. However, the battery replacement process may interrupt shooting and affect a shooting efficiency, and an accidental interruption caused by insufficient power affects shooting quality more seriously.

Auxiliary devices, such as displays, wireless transmission devices, or the like, are usually required to be mounted on bodies of these photographic devices during shooting, and these auxiliary devices also require to be powered by respective batteries. The plural devices are powered by batteries with different models and different capacities, such that the batteries are various and inconvenient to carry, and due to different running-out times of the batteries, a shooting interruption number is larger, and therefore, there is currently a lack of a power supply apparatus for flexibly supplying power to the photographic device and the auxiliary device.

SUMMARY

In order to solve the problem of a low shooting efficiency of a photographic device caused by inflexible power supply, the present application provides an internal power supply apparatus for an auxiliary device supporting a PD protocol.

An internal power supply apparatus for an auxiliary device supporting a PD protocol includes a battery interface, a universal serial bus-power delivery (USB-PD) power interface, a forward power supply circuit, a reverse power supply circuit, a power bus, a control bus and a power supply control circuit;
- a first input end of the forward power supply circuit is connected with a battery through the battery interface;
- an input end of the power bus is connected with an output end of the forward power supply circuit, and an output end of the power bus is connected with an input end of the reverse power supply circuit, an input end of the power supply control circuit and an internal load of the auxiliary device;
- an output end of the reverse power supply circuit is connected with a photographic device through the USB-PD power interface;
- the power supply control circuit controls a voltage value output by the reverse power supply circuit through the control bus.

By adopting the above technical solution, when the USB-PD power interface is connected with the photographic device, electricity on the battery enters the power bus through the forward power supply circuit, the power bus simultaneously supplies power to the internal load, the reverse power supply circuit and the power supply control circuit, the power supply control circuit controls the reverse power supply circuit to output a working voltage required by the photographic device, and at this point, the reverse power supply circuit supplies power to the photographic device through the USB-PD power interface, thus achieving the purpose that one external large-capacity battery simultaneously supplies power to the auxiliary device and the photographic device, solving the problem of a shooting interruption caused by battery replacement, avoiding preparation of a plurality of standby batteries of different models, resulting in convenient outgoing carrying, realizing more flexible power supply of the photographic device, and achieving the aim of improving the shooting efficiency.

In a possible implementation, the forward power supply circuit includes a protection circuit and a selector;
- the protection circuit is provided close to the first input end;
- the selector is provided close to the output end of the forward power supply circuit, and one input end of the selector is connected with an output end of the protection circuit.

By adopting the above technical solution, the protection circuit plays a role in preventing reverse connection and an overvoltage of the battery, thereby protecting the auxiliary device from being damaged when the battery is connected wrongly or the voltage of the battery is over high; the selector is configured to determine whether to connect the battery and the power bus, such that the battery can be dynamically controlled to supply power to the power bus according to actual needs.

In a possible implementation, a second input end of the forward power supply circuit is connected with an external power source through the USB-PD power interface.

In a possible implementation, the forward power supply circuit further includes a second switch transistor, the second switch transistor is arranged close to the second input end, and an output end of the second switch transistor is connected with the other input end of the selector.

By adopting the above technical solution, when the USB-PD power interface is connected with the external power source, electricity on the external power source enters the power bus through the forward power supply circuit, the power bus simultaneously supplies power to the internal load and the power supply control circuit, and at this point, the reverse power supply circuit stops outputting the voltage, thus achieving the aim of supplying power to the auxiliary device through the USB-PD power interface by the external power source.

In a possible implementation, the reverse power supply circuit includes a boost-buck chip and a first switch transistor;
- an input end of the boost-buck chip is connected with the output end of the power bus, an output end of the boost-buck chip is connected with an input end of the first switch transistor, and an output end of the first switch transistor is connected with the USB-PD power interface.

By adopting the above technical solution, the boost-buck chip is configured to adjust the voltage value supplied to the photographic device, and the first switch transistor is configured to determine whether to connect the power bus and the photographic device, thereby achieving the purpose of supplying power to the photographic device by the auxiliary device.

In a possible implementation, the power supply control circuit includes a LDO regulator chip and a PD protocol chip, the PD protocol chip is connected with the power bus through the LDO regulator chip, and the PD protocol chip is connected with the first switch transistor, the second switch transistor, the selector and the boost-buck chip through the control bus.

By adopting the above technical solution, the LDO regulator chip is configured to convert a voltage output by the power bus into a working voltage of the PD protocol chip, so as to ensure that the PD protocol chip can safely and stably operate. The PD protocol chip is configured to uniformly control the first switch transistor, the second switch transistor, the selector and the boost-buck chip, such that when the USB-PD power interface is connected with the photographic device, the PD protocol chip is configured to switch on the first switch transistor, switch off the second switch transistor, and meanwhile drive the selector to connect the battery and the power bus, and the battery simultaneously supplies power to the auxiliary device and the photographic device; when the USB-PD power interface is connected with the external power source, the PD protocol chip is configured to switch on the second switch transistor, switch off the first switch transistor, and meanwhile drive the selector to connect the external power source and the power bus, and the external power source supplies power to the auxiliary device. Therefore, the internal power supply apparatus according to the present application has two power supply modes, and the adaptive power supply mode can be selected according to different application scenarios.

In a possible implementation, each of the first switch transistor and the second switch transistor is composed of two PMOS transistors connected in series.

In a possible implementation, the protection circuit includes a NMOS transistor, a capacitor and a diode which are connected in parallel, the NMOS transistor is provided towards a side where the battery is arranged, and the capacitor and the diode are provided close to a side where the internal load is arranged;

a gate and a source of the NMOS transistor are connected with the battery interface, and a drain of the NMOS transistor is connected with one of the input ends of the selector.

In a possible implementation, the reverse power supply circuit further includes a digital-to-analog converter, the digital-to-analog converter is connected with the boost-buck chip, and the power supply control circuit is connected with the digital-to-analog converter through the control bus.

By adopting the above technical solution, the digital-to-analog converter is configured to collect a voltage value entering the boost-buck chip and a voltage value output by the boost-buck chip, such that the power supply control circuit can dynamically adjust a parameter value of the boost-buck chip according to the voltage value collected by the digital-to-analog converter, and thus adjust the voltage value output by the boost-buck chip, so as to meet a power demand of the photographic device.

In summary, the present application has one of the following beneficial effects.

On the one hand, when the USB-PD power interface is connected with the photographic device, the electricity on the battery enters the power bus through the forward power supply circuit, the power bus simultaneously supplies power to the internal load, the reverse power supply circuit and the power supply control circuit, the power supply control circuit controls the reverse power supply circuit to output the working voltage required by the photographic device, and at this point, the reverse power supply circuit supplies power to the photographic device through the USB-PD power interface, thus achieving the purpose that one external large-capacity battery simultaneously supplies power to the auxiliary device and the photographic device, solving the problem of the shooting interruption caused by battery replacement, avoiding preparation of a plurality of standby batteries of different models, resulting in convenient outgoing carrying, realizing more flexible power supply of the photographic device, and achieving the aim of improving the shooting efficiency. On the other hand, when the USB-PD power interface is connected with the external power source, the electricity on the external power source enters the power bus through the forward power supply circuit, the power bus simultaneously supplies power to the internal load and the power supply control circuit, and at this point, the reverse power supply circuit stops outputting the voltage, thus achieving the aim of supplying power to the auxiliary device through the USB-PD power interface by the external power source.

Figure 1:
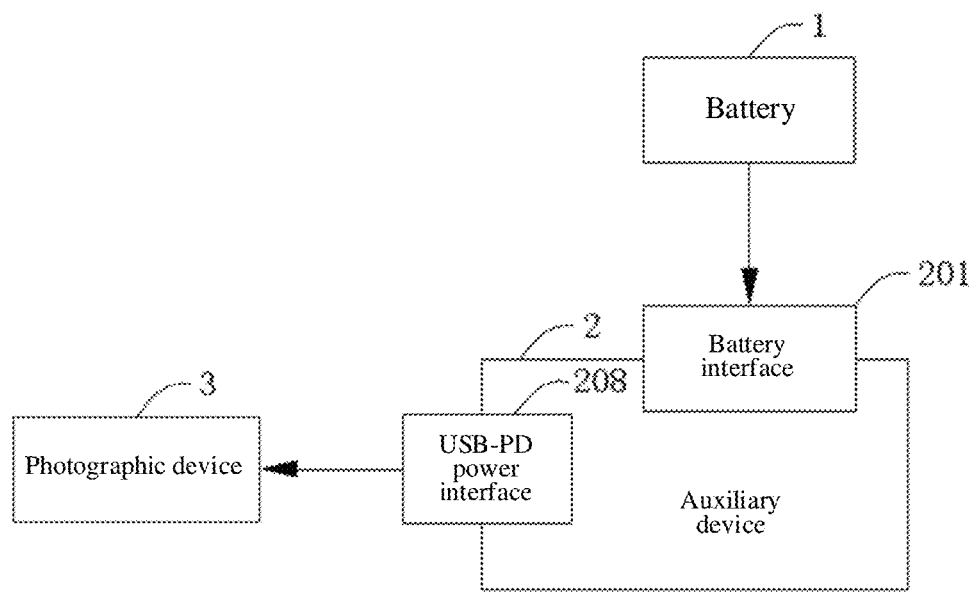
FIG. 1 is a schematic diagram of an exemplary operating environment for a first embodiment of the present application.

Reference signs: 1. Battery; 2. Auxiliary Device; 201. Battery Interface; 202. Protection Circuit; 203. Selector; 204. Internal Load; 205. Boost-buck Chip; 206. Digital-to-analog Converter; 207. First Switch transistor; 208. USB-PD Power Interface; 209. Power Bus; 210. Control Bus; 211. LDO Regulator Chip; 212. PD Protocol Chip; 213. Second Switch transistor; 3. Photographic Device; 4. External Power Source.

DETAILED DESCRIPTION

To make the objectives, technical solutions and advantages of the embodiments of the present application clearer, the technical solutions in the embodiments of the present application are clearly and completely described with reference to the accompanying drawings in the embodiments of the present application, and apparently, the described embodiments are not all but a part of the embodiments of the present application. All other embodiments obtained by a person of ordinary skill in the art based on the embodiments of the present application without creative efforts shall fall within the protection scope of the present application.

First Embodiment

The drawing shows a schematic diagram of an exemplary operating environment in which an embodiment of the present application can be implemented. The operating environment includes a battery 1, an auxiliary device 2 and a photographic device 3, the battery 1 is a large-capacity battery 1 arranged outside the auxiliary device 2, the battery 1 provides a voltage of 6.2V to 16.8V, and the battery 1 is configured to supply power to the auxiliary device 2 and the photographic device 3.

Figure 2:
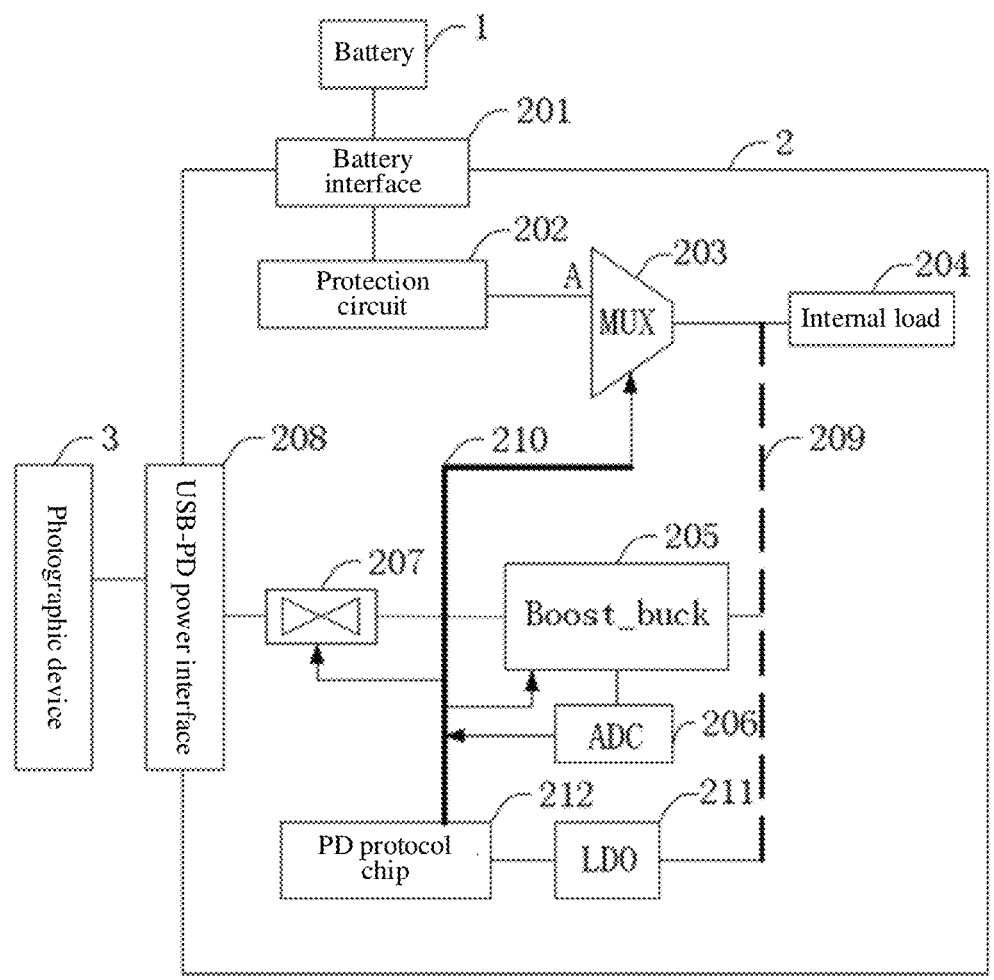
FIG. 2 is a structural view of an internal power supply apparatus for an auxiliary device supporting a PD protocol according to the first embodiment of the present application.

Referring to FIG. 2, the auxiliary device 2 includes an internal power supply apparatus and an internal load 204, and the internal power supply apparatus is configured to receive electricity provided by the battery 1, transfer the electricity to the internal load 204, and output the electricity to the photographic device 3, so as to achieve the purpose that the single battery 1 simultaneously supplies power to the auxiliary device 2 and the photographic device 3. The internal loads 204 refer to other functional modules inside the auxiliary device 2 than the internal power supply apparatus, and these functional modules are original modules inside the auxiliary device 2.

Specifically, the internal power supply apparatus includes a battery interface 201, a USB-PD power interface 208, a forward power supply circuit, a reverse power supply circuit, a power bus 209, a control bus 210, and a power supply control circuit. A first input end of the forward power supply circuit is connected with the battery 1 through the battery interface 201, an input end of the power bus 209 is connected with an output end of the forward power supply circuit, an output end of the power bus 209 is connected with an input end of the reverse power supply circuit, an input end of the power supply control circuit, and the internal load 204, an output end of the reverse power supply circuit is connected with the photographic device 3 through the USB-PD power interface 208, and the electricity on the battery 1 sequentially passes through the battery interface 201, the forward power supply circuit and the power bus 209 and then enters the internal load 204; that is, the internal load 204 is powered on. In addition, the power supply control circuit controls a voltage value output by the reverse power supply circuit through the control bus 210, such that after the power bus 209 transfers the electricity provided by the battery 1 into the reverse power supply circuit, the voltage value supplied by the reverse power supply circuit to the photographic device 3 is controlled by the power supply control circuit, so as to guarantee safe and stable operation of the photographic device 3.

Further, the forward power supply circuit includes a protection circuit 202 and a selector 203, the protection circuit 202 is arranged close to the first input end, and the protection circuit 202 plays a role in preventing reverse connection and an overvoltage of the battery 1, thereby protecting the auxiliary device 2 from being damaged when the battery 1 is connected wrongly or the voltage of the battery 1 is over high. The selector 203 is provided close to the output end of the forward power supply circuit, and the selector 203 is a power selector for determining whether to connect the battery 1 and the power bus 209. In FIG. 2, an input end of the selector 203 connected with the protection circuit 202 is denoted by A.

Figure 3:
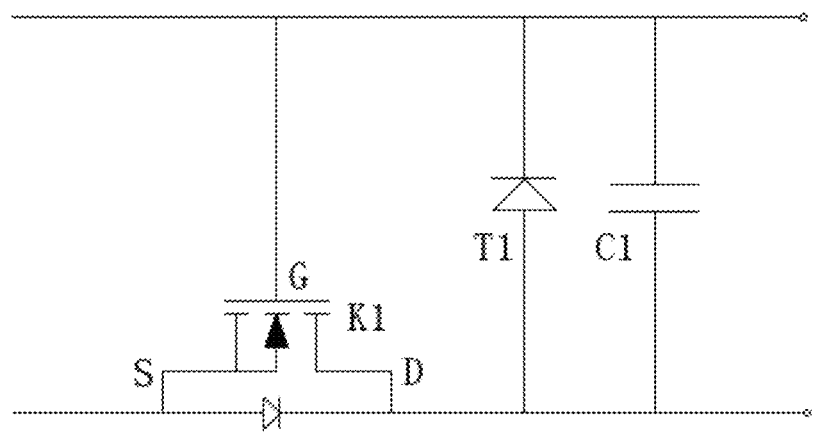
FIG. 3 is a circuit diagram of a protection circuit of the internal power supply apparatus according to the first embodiment of the present application.

Referring to FIG. 3, in a specific example, the protection circuit 202 includes a NMOS transistor K1, a capacitor C1, and a diode T1 connected in parallel. The NMOS transistor K1 is provided towards a side where the battery 1 is arranged, a gate and a source of the NMOS transistor K1 are interfaced with the battery 1, and a drain of the NMOS transistor K1 is connected with the input end A of the selector 203. The capacitor C1 and the diode T1 are provided close to a side where the internal load 204 is arranged. In other examples, the protection circuit 202 may also be a transient voltage suppressor (TVS). In practical use, a specific structure of the protection circuit 202 is not limited herein, as long as the protection effect of preventing the reverse connection and the overvoltage of the battery 1 can be achieved.

Referring to FIG. 2, the reverse power supply circuit includes a boost-buck chip 205, a digital-to-analog converter 206 and a first switch transistor 207, an input end of the boost-buck chip 205 is connected with the output end of the power bus 209, an output end of the boost-buck chip 205 is connected with an input end of the first switch transistor 207, and an output end of the first switch transistor 207 is connected with the USB-PD power interface 208. An input end of the digital-to-analog converter 206 is connected to the input end and the output end of the boost-buck chip 205, and configured to collect a voltage value entering the boost-buck chip 205 and a voltage value output by the boost-buck chip 205. The power supply control circuit is connected with the selector 203, the boost-buck chip 205, the digital-to-analog converter 206 and the first switch transistor 207 through the control bus 210, and the connection is indicated by a solid line with an arrow in FIG. 2. Specifically, the power supply control circuit can dynamically adjust a parameter value of the boost-buck chip 205 according to the voltage value collected by the digital-to-analog converter 206, and thus adjust the voltage value output by the boost-buck chip 205, so as to meet a power demand of the photographic device 3. In FIG. 2, the boost-buck chip 205 is denoted by Boost_buck, and the digital-to-analog converter 206 is denoted by DAC.

Figure 4:
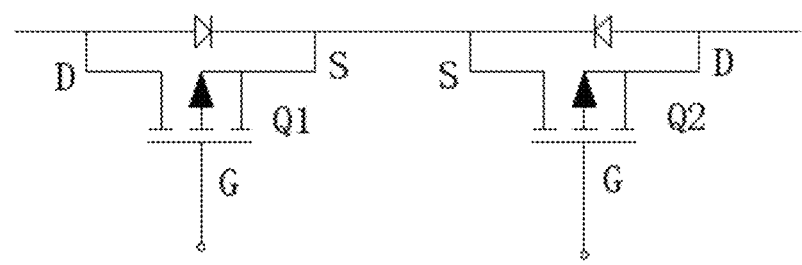
FIG. 4 is a circuit diagram of a first switch transistor of the internal power supply apparatus according to the first embodiment of the present application.

Referring to FIG. 4, the above first switch transistor 207 is composed of two PMOS transistors connected in series, the two PMOS transistors are a first MOS transistor Q1 and a second MOS transistor Q2, a drain of the first MOS transistor Q1 is connected with the power bus 209, a source of the first MOS transistor Q1 is connected with a source of the second MOS transistor Q2 in series, a drain of the second MOS transistor Q2 is connected with the USB-PD power interface 208, and a gate of the first MOS transistor Q1 and a gate of the second MOS transistor Q2 are both connected to the control bus 210 and uniformly controlled by the power supply control circuit. In addition, parasitic diodes are arranged on the first MOS transistor Q1 and the second MOS transistor Q2 respectively, and configured to protect circuit safety of the first MOS transistor Q1 and the second MOS transistor Q2.

It should be noted that the power bus 209 is an original circuit structure in the auxiliary device 2, and the power bus 209 is a generic term of a structure which can convert the electricity supplied from the battery 1 into the electricity required by the internal load 204. The control bus 210 is a cable provided between the power supply control circuit and modules controlled by the power supply control circuit, and is mainly configured to transmit control signals of the power supply control circuit. In FIG. 2, the power bus 209 is denoted by a bold dashed line, and the control bus 210 is denoted by a bold solid line.

The power supply control circuit includes a LDO regulator chip 211 and a PD protocol chip 212, the PD protocol chip 212 is connected with the power bus 209 through the LDO regulator chip 211, and the PD protocol chip 212 is powered by the power bus 209. In a specific example, a working voltage of the PD protocol chip 212 is 5V, and therefore, the LDO regulator chip converts the voltage obtained from the power bus 209 into a voltage of 5V, and then transmits the voltage to the PD protocol chip 212. The PD protocol chip 212 is connected with the selector 203, the boost-buck chip 205, the digital-to-analog converter 206, and the first switch transistor 207 through the control bus 210, and configured to integrally control the battery 1 to supply power to the power bus 209, and the reverse power supply circuit provides a required voltage for the photographic device 3.

In conclusion, the internal power supply apparatus for an auxiliary device supporting a PD protocol according to the first embodiment of the present application has an implementation principle that when the USB-PD power interface 208 is connected with the photographic device 3, the PD protocol chip 212 drives the selector 203 to connect the battery 1 and the power bus 209, the power bus 209 obtains the electricity from the battery 1, and then, the power bus 209 simultaneously supplies power to the internal load 204, the reverse power supply circuit, and the power supply control circuit, the PD protocol chip 212 also switches on the first switch transistor 207 and controls the boost-buck chip 205 to output the working voltage required by the photographic device 3, and at this point, the reverse power supply circuit supplies power to the photographic device 3 through the USB-PD power interface 208, thereby achieving the purpose that one external large-capacity battery 1 simultaneously supplies power to the auxiliary device 2 and the photographic device 3.

It should be noted that, in practical application, another electronic device supporting the PD protocol may be connected to the USB-PD power interface 208, and therefore, the PD protocol chip 212 reads a working voltage of the electronic device and then controls the voltage value provided by the reverse power supply circuit for the electronic device, such that the internal power supply apparatus according to the present application has a wider application range.

Second Embodiment

Figure 5:
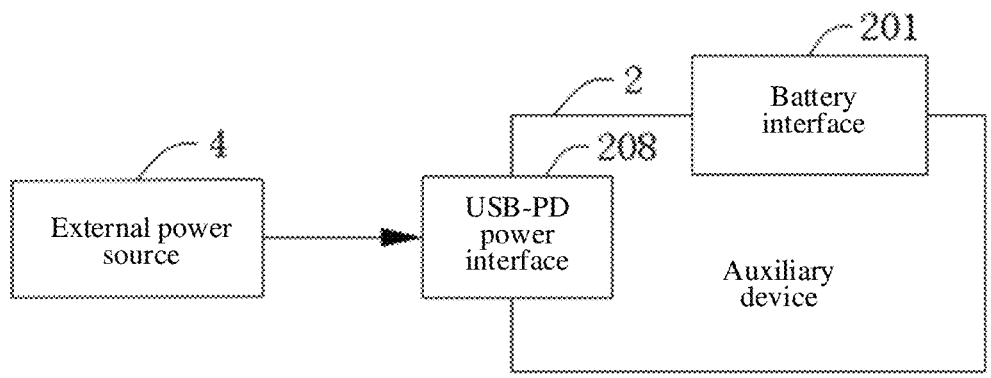
FIG. 5 is a schematic diagram of an exemplary operating environment for a second embodiment of the present application.

Referring to FIG. 5, the second embodiment is different from the first embodiment in that the forward power supply circuit further includes a second input end, the second input end of the forward power supply circuit is connected with the external power source 4 through the USB-PD power interface 208, and the external power source 4 is, for example, a portable charger and an indoor power source; that is, the external power source 4 is a power source with power entering the auxiliary device 2 after subjected to voltage matching and voltage conversion.

Figure 6:
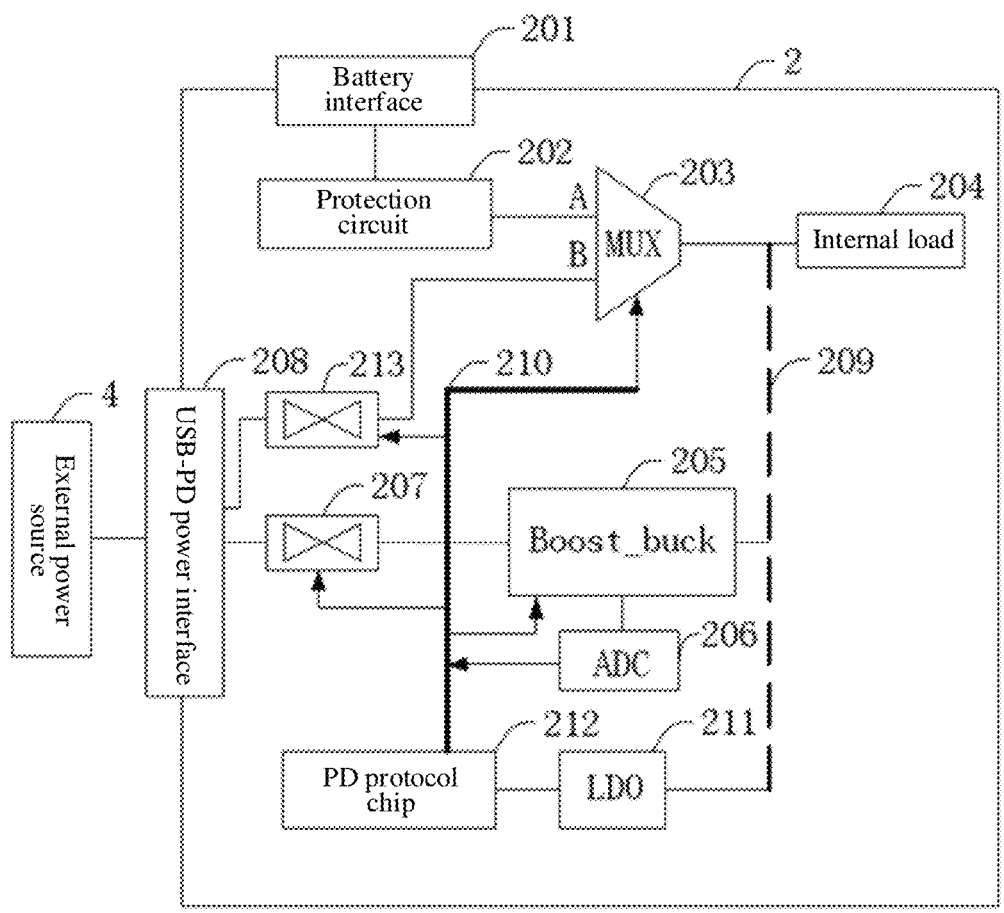
FIG. 6 is a structural view of an internal power supply apparatus for an auxiliary device supporting a PD protocol according to the second embodiment of the present application.

Referring to FIG. 6, a second switch transistor 213 is provided at an end of the forward power supply circuit close to the second input end, an input end of the second switch transistor 213 is connected with the USB-PD power interface 208, an output end of the second switch transistor 213 is connected with the other input end of the selector 203, and a port of the connection is denoted by B. The power supply control circuit is connected with the second switch transistor 213 through the control bus 210.

It should be noted that the second switch transistor 213 is similar to the first switch transistor 207, the second switch transistor 213 is also composed of two PMOS transistors connected in series, and a connection manner of the two PMOS transistors is the same as that of the two PMOS transistors in the first switch transistor 207. For convenience of distinction, the two PMOS transistors in the second switch transistor 213 are referred to as a third MOS transistor Q3 and a fourth MOS transistor Q4 (not shown) respectively, a drain of the third MOS transistor Q3 is connected with the USB-PD power interface 208, a source of the third MOS transistor Q3 is connected with a source of the fourth MOS transistor Q4 in series, a drain of the fourth MOS transistor Q4 is connected with the input end B of the selector 203, a gate of the third MOS transistor Q3 and a gate of the fourth MOS transistor Q4 are both connected to the control bus 210, and the PD protocol chip 212 controls the third MOS transistor Q3 and the fourth MOS transistor Q4 to be switched on or off. In addition, parasitic diodes are arranged on the third MOS transistor Q3 and the fourth MOS transistor Q4 respectively, and configured to protect circuit safety of the third MOS transistor Q3 and the fourth MOS transistor Q4.

In conclusion, the internal power supply apparatus for an auxiliary device supporting a PD protocol according to the second embodiment of the present application has an implementation principle that when the USB-PD power interface 208 is connected with the external power source 4, the PD protocol chip 212 drives the second switch transistor 213 to connect the external power source 4 and the power bus 209, the power bus 209 obtains the electricity from the external power source 4, the power bus 209 simultaneously supplies power to the internal load 204 and the power supply control circuit, the PD protocol chip 212 switches off the first switch transistor 207 and the boost-buck chip 205, and at this point, the reverse power supply circuit stops outputting the voltage, thus achieving the purpose that the external power source 4 supplies power to the auxiliary device 2 through the USB-PD power interface 208.

The foregoing description is only preferred embodiments of the present application and is illustrative of the principle of the employed technology. It will be appreciated by those skilled in the art that the scope of the disclosure herein is not limited to the technical solution formed by a particular combination of technical features described above, but also encompasses other technical solutions formed by any combination of the technical features described above or equivalents thereof without departing from the concept of the disclosure, for example, technical solutions formed by mutually replacing the above features and the technical features (but not limited to) having similar functions disclosed in the present application.

What is claimed is:

1. An internal power supply apparatus for an auxiliary device supporting a power delivery (PD) protocol, comprising: a battery interface, a universal serial bus-power delivery (USB-PD) power interface, a forward power supply circuit, a reverse power supply circuit, a power bus, a control bus and a power supply control circuit;

wherein a first input end of the forward power supply circuit is connected with a battery through the battery interface;

an input end of the power bus is connected with an output end of the forward power supply circuit, and an output end of the power bus is connected with an input end of the reverse power supply circuit, an input end of the power supply control circuit and an internal load of the auxiliary device;

an output end of the reverse power supply circuit is connected with a photographic device through the USB-PD power interface;

the power supply control circuit is configured to control, through the control bus, a voltage value output by the reverse power supply circuit;

the forward power supply circuit comprises a protection circuit and a selector;

the protection circuit is provided close to the first input end of the forward power supply circuit;

the selector is provided close to the output end of the forward power supply circuit, and a first input end of the selector is connected with an output end of the protection circuit;

the protection circuit comprises an n-channel metal-oxide semiconductor (NMOS) transistor, a capacitor and a diode which are connected in parallel, the NMOS transistor is provided towards a side of the internal power supply apparatus where the battery is arranged, and the capacitor and the diode are provided close to a side of the internal power supply apparatus where the internal load is arranged; and a gate and a source of the NMOS transistor are connected with the battery interface, and a drain of the NMOS transistor is connected with one of the first input end or a second input end of the selector.

2. The internal power supply apparatus for the auxiliary device supporting the PD protocol according to claim 1, wherein a second input end of the forward power supply circuit is connected with an external power source through the USB-PD power interface.

3. The internal power supply apparatus for the auxiliary device supporting the PD protocol according to claim 2, wherein the forward power supply circuit further comprises a second switch transistor, the second switch transistor is arranged close to the second input end of the forward power supply circuit, and an output end of the second switch transistor is connected with the second input end of the selector.

4. The internal power supply apparatus for the auxiliary device supporting the PD protocol according to claim 3, wherein the reverse power supply circuit comprises a boost-buck chip and a first switch transistor; and an input end of the boost-buck chip is connected with the output end of the power bus, an output end of the boost-buck chip is connected with an input end of the first switch transistor, and an output end of the first switch transistor is connected with the USB-PD power interface.

5. The internal power supply apparatus for the auxiliary device supporting the PD protocol according to claim 4, wherein the power supply control circuit comprises a low-dropout (LDO) regulator chip and a PD protocol chip, the PD protocol chip is connected with the power bus through the LDO regulator chip, and the PD protocol chip is connected with the first switch transistor, the second switch transistor, the selector and the boost-buck chip through the control bus.

6. The internal power supply apparatus for the auxiliary device supporting the PD protocol according to claim 4, wherein the reverse power supply circuit further comprises a digital-to-analog converter, the digital-to-analog converter is connected with the boost-buck chip, and the power supply control circuit is connected with the digital-to-analog converter through the control bus.

7. The internal power supply apparatus for the auxiliary device supporting the PD protocol according to claim 5, wherein each of the first switch transistor and the second switch transistor is composed of two p-channel metal-oxide semiconductor (PMOS) transistors connected in series.

8. An internal power supply apparatus for an auxiliary device supporting a power delivery (PD) protocol, comprising: a battery interface, a universal serial bus-power delivery (USB-PD) power interface, a forward power supply circuit, a reverse power supply circuit, a power bus, a control bus and a power supply control circuit;

wherein a first input end of the forward power supply circuit is connected with a battery through the battery interface;

an input end of the power bus is connected with an output end of the forward power supply circuit, and an output end of the power bus is connected with an input end of the reverse power supply circuit, an input end of the power supply control circuit and an internal load of the auxiliary device;

an output end of the reverse power supply circuit is connected with a photographic device through the USB-PD power interface;

the power supply control circuit is configured to control, through the control bus, a voltage value output by the reverse power supply circuit;

the forward power supply circuit comprises a protection circuit and a selector;

the protection circuit is provided close to the first input end of the forward power supply circuit;

the selector is provided close to the output end of the forward power supply circuit, and a first input end of the selector is connected with an output end of the protection circuit;

a second input end of the forward power supply circuit is connected with an external power source through the USB-PD power interface; and the forward power supply circuit further comprises a second switch transistor, the second switch transistor is arranged close to the second input end of the forward power supply circuit, and an output end of the second switch transistor is connected with a second input end of the selector.

* * * * *